(12) United States Patent
Wang (10) Patent No.: US 11,157,101 B2
(45) Date of Patent: Oct. 26, 2021

(54) TOUCH PANEL COMPRISING PLURALITY OF TRACES, METHOD FOR MAKING THE SAME, AND TOUCH DISPLAY DEVICE

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Jin-Li Wang, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Hsinchu (TW)

( * ) Notice: Subject to any disclaimer, the term of this patent is extended or adjusted under 35 U.S.C. 154(b) by 0 days.

(21) Appl. No.: 16/822,135

(22) Filed: Mar. 18, 2020

(65) Prior Publication Data
US 2021/0223878 A1  Jul. 22, 2021

(30) Foreign Application Priority Data
Jan. 19, 2020 (CN) .......................... 202010061395.1

(51) Int. Cl.
*G06F 3/041* (2006.01)
*G09G 3/3266* (2016.01)

(52) U.S. Cl.
CPC .... *G06F 3/041* (2013.01); *G06F 2203/04103* (2013.01)

(58) Field of Classification Search
CPC ..................... G06F 3/041; G06F 2203/04103
See application file for complete search history.

(56) References Cited

U.S. PATENT DOCUMENTS

| | | | |
|---|---|---|---|
| 10,732,744 B2* | 8/2020 | Cho | H01L 27/323 |
| 2012/0154309 A1* | 6/2012 | Yoshifusa | G06F 3/047 345/173 |
| 2015/0097175 A1* | 4/2015 | Liu | G06F 3/0445 257/40 |
| 2015/0234486 A1* | 8/2015 | Huang | B23K 26/361 430/319 |
| 2018/0197885 A1* | 7/2018 | Lee | H01L 23/544 |

* cited by examiner

*Primary Examiner* — Kwang-Su Yang
(74) *Attorney, Agent, or Firm* — ScienBiziP, P.C.

(57) ABSTRACT

A touch panel includes a substrate, a plurality of first electrodes on the substrate, a transparent conductive photoresist film on the substrate, an insulating protection layer on the transparent conductive photoresist film, a plurality of first traces electrically connecting to the first electrodes, and a plurality of second traces electrically connecting to the second electrodes. The transparent conductive photoresist film includes a transparent photoresist layer on the substrate and a conductive layer on a surface of the transparent photoresist layer away from the substrate. The transparent photoresist layer is electrically insulative and covers the first electrodes. The second traces extend through the insulating protection layer.

9 Claims, 6 Drawing Sheets

TOUCH PANEL COMPRISING PLURALITY OF TRACES, METHOD FOR MAKING THE SAME, AND TOUCH DISPLAY DEVICE

FIELD

The subject matter herein generally relates to a touch panel, a method for making the touch panel, and a touch display device using the touch panel.

BACKGROUND

A touch panel generally defines a touch area and a border area surrounding the touch area. Touch electrodes are provided in the touch area, and traces connected to the touch electrodes are provided in the border area. A conventional method for making a touch panel uses nano-silver to form touch electrodes, and copper alloys to form traces. A nano-silver layer is deposited on a substrate, a copper alloy layer is deposited on the nano-silver layer, and then the copper alloy layer is etched by using an acidic etchant. However, during the etching process, the acidic etchant will damage the underlying nano-silver layer. In addition, the wet etching process is prone to formation of feathers of copper alloys due to the residual chemical solution, and there is a risk of short-circuiting the conductive traces.

BRIEF DESCRIPTION OF THE DRAWINGS

Implementations of the present technology will now be described, by way of embodiments only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

First Embodiment

Figure 1:
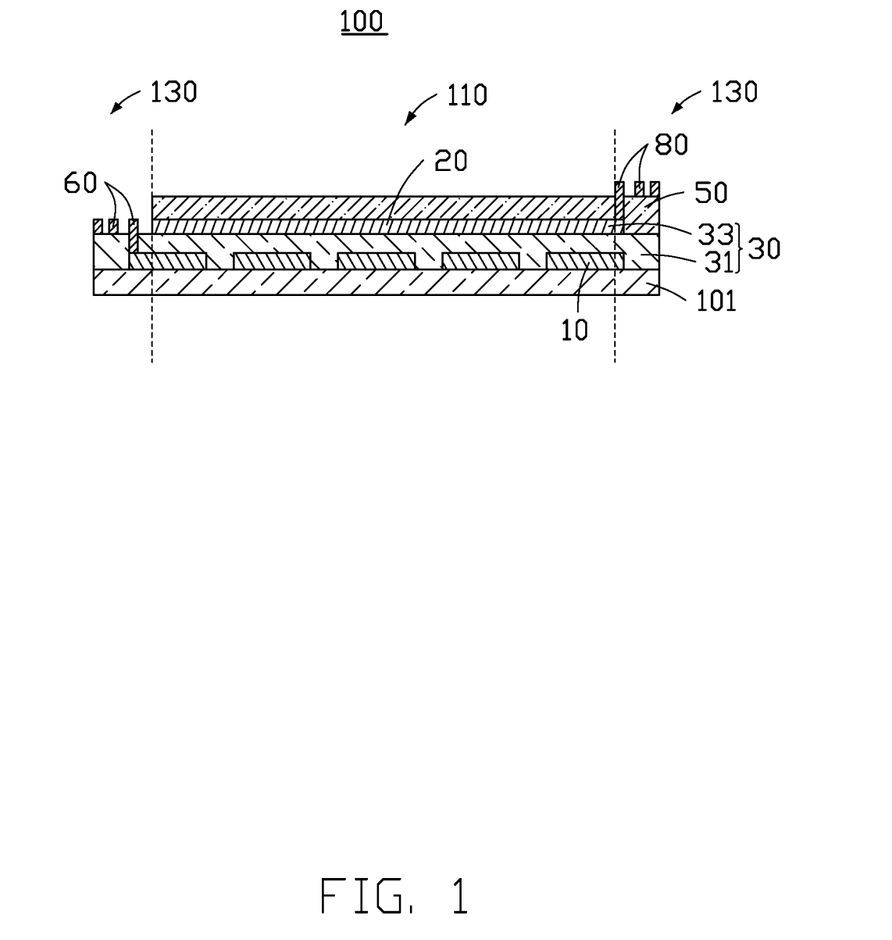
FIG. 1 is a cross-sectional view of a touch panel according to a first embodiment of the present disclosure.

FIG. 1 shows a touch panel 100. The touch panel 100 includes a substrate 101, a plurality of first electrodes 10 on a surface of the substrate 101, a transparent conductive photoresist film 30 on the substrate 101, and an insulating protection layer 50 on a surface of the transparent conductive photoresist film 30 away from the substrate 101. The transparent conductive photoresist film 30 includes a transparent photoresist layer 31 on the substrate 101 and a conductive layer 33 on a surface of the transparent photoresist layer 31 away from the substrate 101. The transparent photoresist layer 31 is electrically insulating and covers the first electrodes 10. The conductive layer 33 forms a plurality of second electrodes 20, only one second electrode 20 is shown in FIG. 1. The touch panel 100 further includes a plurality of first traces 60 electrically connected to the first electrodes 10 and a plurality of second traces 80 electrically connected to the second electrodes 20. The first electrodes 10 and the second electrodes 20 may be touch driving electrodes and touch sensing electrodes, each of the first electrodes 10 crosses and is electrically insulated from the second electrodes 20.

The transparent photoresist layer 31 has a certain adhesion and the transparent conductive photoresist film 30 can be transferred to the substrate 101 by attaching a side of the transparent conductive photoresist film 30 having the transparent photoresist layer 31 onto the substrate 101.

As shown in FIG. 1, the touch panel 100 defines a touch area 110 and a border area 130 surrounding the touch area 110. The first electrodes 10 and the second electrodes 20 are in the touch area 110, and the first traces 60 and the second traces 80 are in the border area 130.

In this embodiment, each first trace 60 is located on a surface of the transparent photoresist layer 31 away from the substrate 101 and extends through the transparent photoresist layer 31 to electrically connect to one first electrode 10. Each second trace 80 is located on a surface of the insulating protection layer 50 away from the substrate 101 and extends through the insulating protection layer 50 to electrically connect to one second electrode 20.

In this embodiment, the insulating protection layer 50 completely covers the touch area 110 but does not completely cover the transparent photoresist layer 31. The insulating protection layer 50 partially covers the transparent photoresist layer 31. The first traces 60 are located in a region of the transparent photoresist layer 31 not covered by the insulating protective layer 50.

In this embodiment, the substrate 101 is transparent and electrically insulative, and the substrate 101 is flexible, so that the touch panel 100 as a whole is flexible and bendable. The substrate 101 may be made of polyethylene terephthalate (PET), polyethylene (PE), cycloolefin polymer (COP), polymethyl methacrylate (PMMA), or other flexible plastic polymer materials. The substrate 101 has a thickness of 5 microns to 150 microns.

Figure 2:
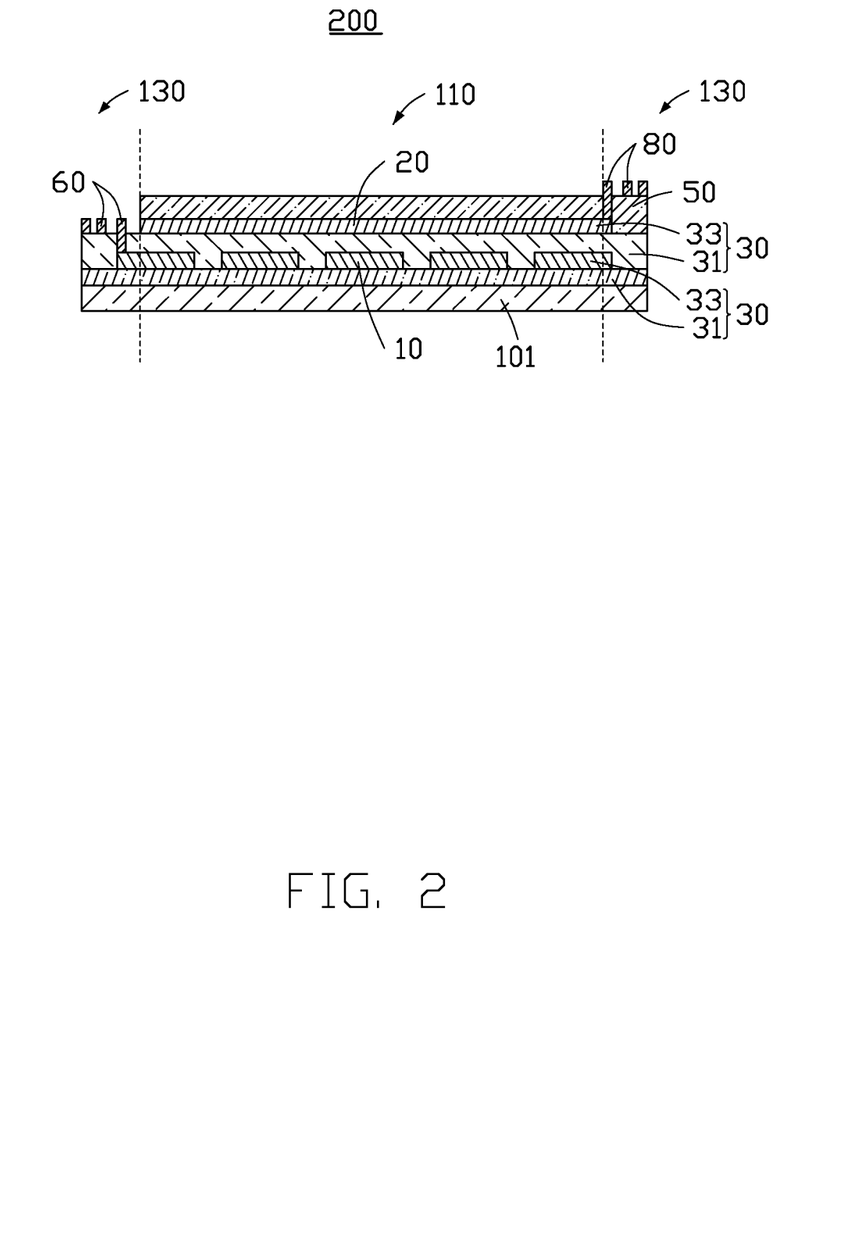
FIG. 2 is a cross-sectional view of a modified embodiment of the touch panel of FIG. 1.

The first electrodes 10 may be made of nano metal wires, conductive polymer, or metal grids. In a modified embodiment, the first electrodes 10 are formed by a transparent conductive photoresist film 30. The touch panel 200 shown in FIG. 2 is basically the same as the touch panel 100 of the first embodiment, except that the first electrodes 10 are made by an additional transparent conductive photoresist film 30. The additional transparent conductive photoresist film 30 is between the substrate 101 and the transparent conductive photoresist film 30 that forms the second electrodes 20. The additional transparent conductive photoresist film 30 includes an insulating transparent photoresist layer 31 covering the substrate 101 and an additional conductive layer 33 on a surface of the transparent photoresist layer 31 away from the substrate 101. The additional conductive layer 33 forms the first electrodes 10.

The conductive layer 33 of the transparent conductive photoresist film 30 can be nano metal wires, conductive polymers, carbon nanotubes, graphene, or metal grids. The thickness of the conductive layer 33 is 0.1 to 2 micrometers. The transparent photoresist layer 31 is made of a transparent and insulating photosensitive resin and has a thickness between 2 and 30 microns.

The insulating protection layer 50 is made of a transparent, insulating, and photosensitive resin. The insulating protection layer 50 has a thickness of 3 to 10 micrometers.

The first traces 60 and the second traces 80 is made of a conductive metal or alloy, for example, at least one of copper, nickel, silver, titanium, aluminum, molybdenum, gold, and manganese.

Second Embodiment

Figure 3:
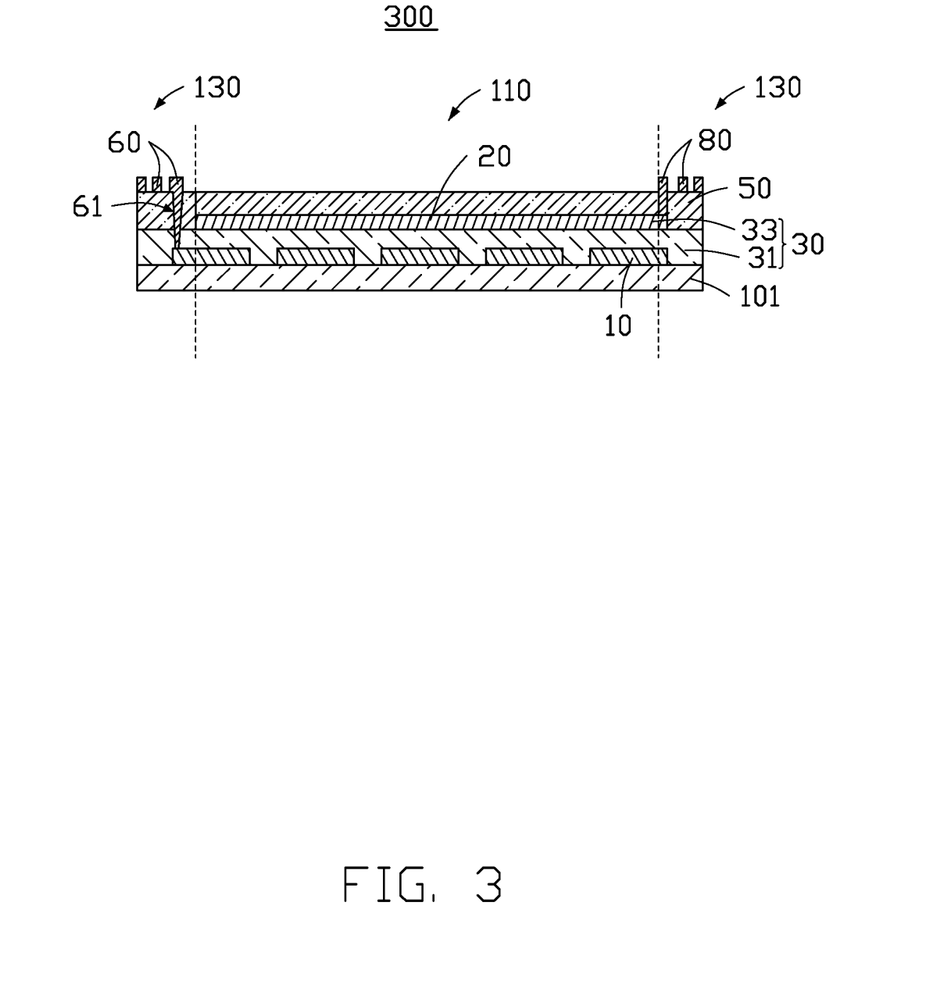
FIG. 3 is a cross-sectional view of a touch panel according to a second embodiment of the present disclosure.

FIG. 3 shows a touch panel 300 according to a second embodiment of the present disclosure. The touch panel 300 includes a substrate 101, a plurality of first electrodes 10 on a surface of the substrate 101, a transparent conductive photoresist film 30 on the substrate 101 and covering the first electrodes 10, and an insulating protection layer 50 on a surface of the transparent conductive photoresist film 30 away from the substrate 101. The transparent conductive photoresist film 30 includes a transparent photoresist layer 31 on the substrate 101 and covering the first electrodes 10, and a conductive layer 33 on a surface of the transparent photoresist layer 31 away from the substrate 101. The transparent photoresist layer 31 is electrically insulative. The conductive layer 33 forms a plurality of second electrodes 20. The touch panel 300 further includes a plurality of first traces 60 electrically connected to the first electrodes 10 and a plurality of second traces 80 electrically connected to the second electrodes 20. As shown in FIG. 3, the touch panel 300 defines a touch area 110 and a border area 130 surrounding the touch area 110. The first electrodes 10 and the second electrodes 20 are located in the touch area 110, and the first traces 60 and the second traces 80 are located in the border area 130.

In this embodiment, the insulating protection layer 50 completely covers the touch area 110 and the border area 130, the first traces 60 and the second traces 80 are positioned on a surface of the insulating protection layer 50 away from the substrate 101. Each first trace 60 extends through both the insulating protection layer 50 and the transparent photoresist layer 31 to electrically connect to one of the first electrodes 10. Each second trace 80 extends through the insulating protection layer 50 to electrically connect to one of the second electrodes 20.

Referring to FIG. 3, the first trace 60 extends through the insulating protection layer 50 and the transparent photoresist layer 31 to electrically connect to the first electrode 10. Thus, through holes 61 are defined in both the insulating protection layer 50 and the transparent photoresist layer 31 and conductive metal is formed on wall of each through hole 61 and is in contact with the first electrode 10. Opening area of each through hole 61 gradually changes in a thickness direction of the touch panel 100. In this embodiment, the opening area of the through hole 61 gradually increases in the thickness direction of the touch panel 100 from the transparent photoresist layer 31 toward the insulating protection layer 50, which facilitates metal deposition on the wall of the through hole 61. The opening area of the through hole 51 in the insulating protection layer 50 is greater than the opening area of the through hole 61 in the transparent photoresist layer 31. In this embodiment, an opening area of the through hole 61 on the surface of the insulating protection layer 50 away from the substrate 101 is less than or equal to 1 square millimeter.

Figure 4:
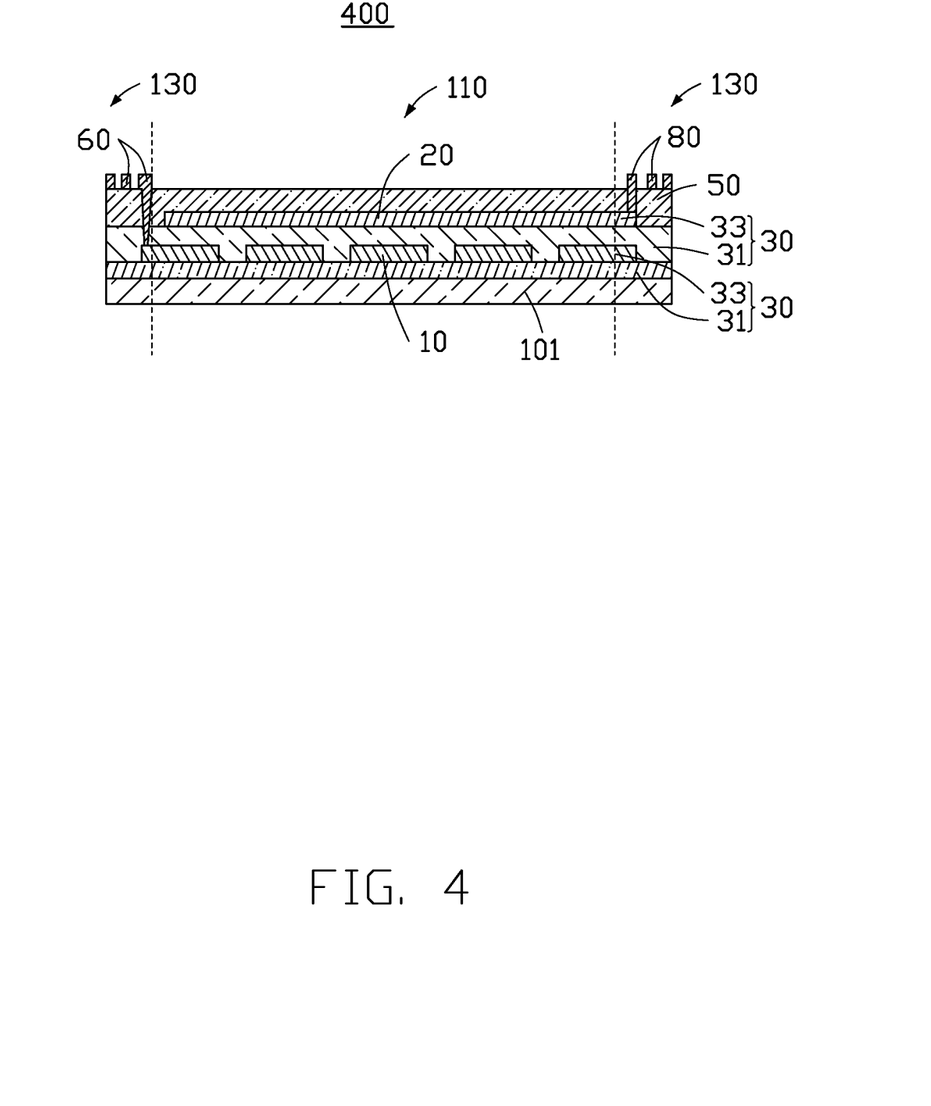
FIG. 4 is a cross-sectional view of a modified embodiment of the touch panel of FIG. 3.

In a modified embodiment, the first electrodes 10 can be formed by a transparent conductive photoresist film 30. A touch panel 400 shown in FIG. 4 is basically the same as the touch panel 300 of the second embodiment, except that the first electrodes 10 are formed by a transparent conductive photoresist film 30. An additional transparent conductive photoresist film 30 is between the substrate 101 and the transparent conductive photoresist film that forms the second electrodes 20. The additional transparent conductive photoresist film 30 includes a transparent photoresist layer 31 covering the substrate 101 and an additional conductive layer 33 on a surface of the transparent photoresist layer 31 away from the substrate 101. The additional conductive layer 33 forms the plurality of first electrodes 10. The transparent photoresist layer 31 is electrically insulating.

Figure 5:
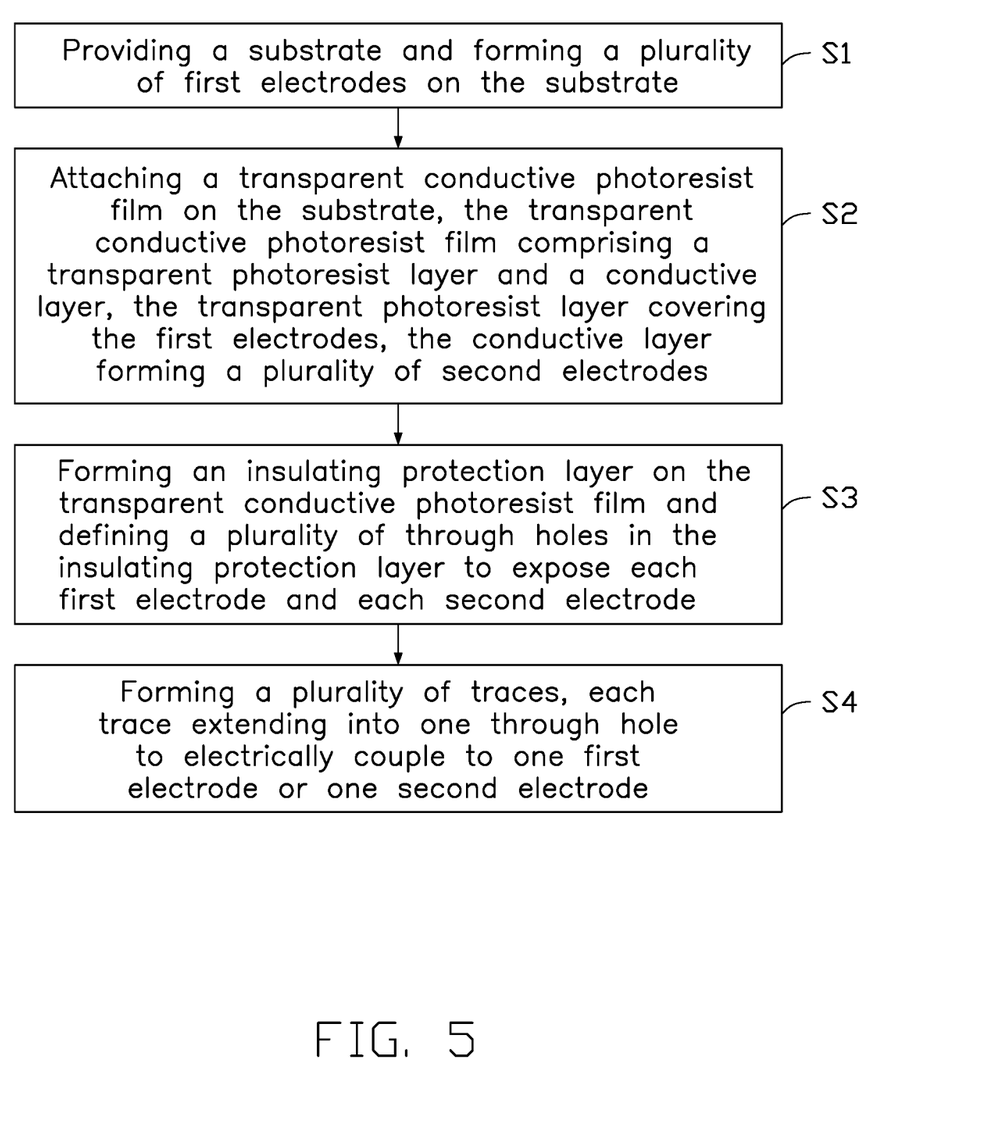
FIG. 5 is a flowchart of a method for making a touch panel.

FIG. 5 shows a flowchart of a method for making the above described touch panel. The method includes the follows steps.

Block S1: a substrate 101 is provided, and a plurality of first electrodes 10 are formed on a surface of the substrate 101.

The substrate 101 is transparent and flexible. The substrate 101 may be made of PET, PE, CPI, COP, PMMA, CBC or other flexible plastic polymer materials, and has a thickness between 5 microns and 150 microns.

In one embodiment, S1 specifically includes forming a conductive material layer on a surface of the substrate 101 and patterning the conductive material layer to form the plurality of first electrodes 10. The step of patterning the conductive material layer further includes coating photoresist on a surface of the conductive material layer away from the substrate 101, exposing and developing the photoresist to retain a portion of the photoresist on the conductive material layer, and then etching the conductive material layer. A portion of the conductive material layer that is not covered by the photoresist is removed by etching, and other portion of the conductive material layer covered by the photoresist remains to form the first electrodes 10. The conductive material layer may be made of nano metal, conductive polymer, or metal grids.

In another embodiment, step S1 specifically includes attaching a transparent conductive photoresist film 30 on a surface of the substrate 101. The transparent conductive photoresist film 30 includes a transparent photoresist layer 31 and a conductive layer 33 on the transparent photoresist layer 31. The transparent photoresist layer 31 is directly attached to the substrate 101, and the conductive layer 33 forms the first electrodes 10.

Block S2: a transparent conductive photoresist film 30 is attached to the substrate 101. The transparent conductive photoresist film 30 includes a transparent photoresist layer 31 and a conductive layer 33 laminated on the transparent photoresist layer 31. The substrate 101 attaches on the substrate 101 and covers the first electrodes 10, and the conductive layer 33 is located on the surface of the transparent photoresist layer 31 away from the substrate 101 to form the second electrodes 20.

Block S3: an insulating protection layer 50 is formed on a surface of the transparent conductive photoresist film 30 away from the substrate 101. Through holes are defined in the insulating protection layer 50 to partially expose each of the first electrodes 10 and each of the second electrodes 20.

The insulating protection layer 50 is made of a transparent, insulating, and photosensitive resin. The insulating protection layer 50 has a thickness of 3 micrometers to 10 micrometers.

In one embodiment, defining through holes in the insulating protection layer 50 specifically includes: defining through holes of a first type in the insulating protection layer 50, to partially expose each of the second electrodes 20, and defining through holes of a second type in both the insulating protection layer 50 and the transparent photoresist layer 31, to expose each of the first electrodes 10.

In another embodiment, defining through holes in the insulating protection layer 50 specifically includes defining through holes in the insulating protection layer 50 to partially expose each of the second electrodes 20, and removing an edge portion of the insulating protection layer 50 to expose the transparent photoresist layer 31, and defining through holes in an exposed part of the transparent photoresist layer 31 to partially expose each of the first electrodes 10.

Block S4: forming traces that extend into the through holes to connect the first electrodes 10 and the second electrodes 20.

In one embodiment, S4 specifically includes forming a conductive metal layer on a surface of the insulating protection layer 50 away from the substrate 101, and patterning the conductive metal layer to form first traces 60 connected to the first electrodes 10 and second traces 80 connected to the second electrodes 20. The conductive metal layer extends into the though holes. The step of patterning the conductive metal layer is similar to the step of the patterning the conductive material layer described above, details are not repeated.

In another embodiment, step S4 specifically includes forming a conductive metal layer on the surface of the insulating protection layer 50 away from the substrate 101 and on an exposed surface of the transparent photoresist layer 31 away from the substrate 101. The conductive metal layer is patterned to form first traces 60 connected to the first electrodes 10 and second traces 80 connected to the second electrodes 20. The conductive metal layer extends into the though holes.

Figure 6:
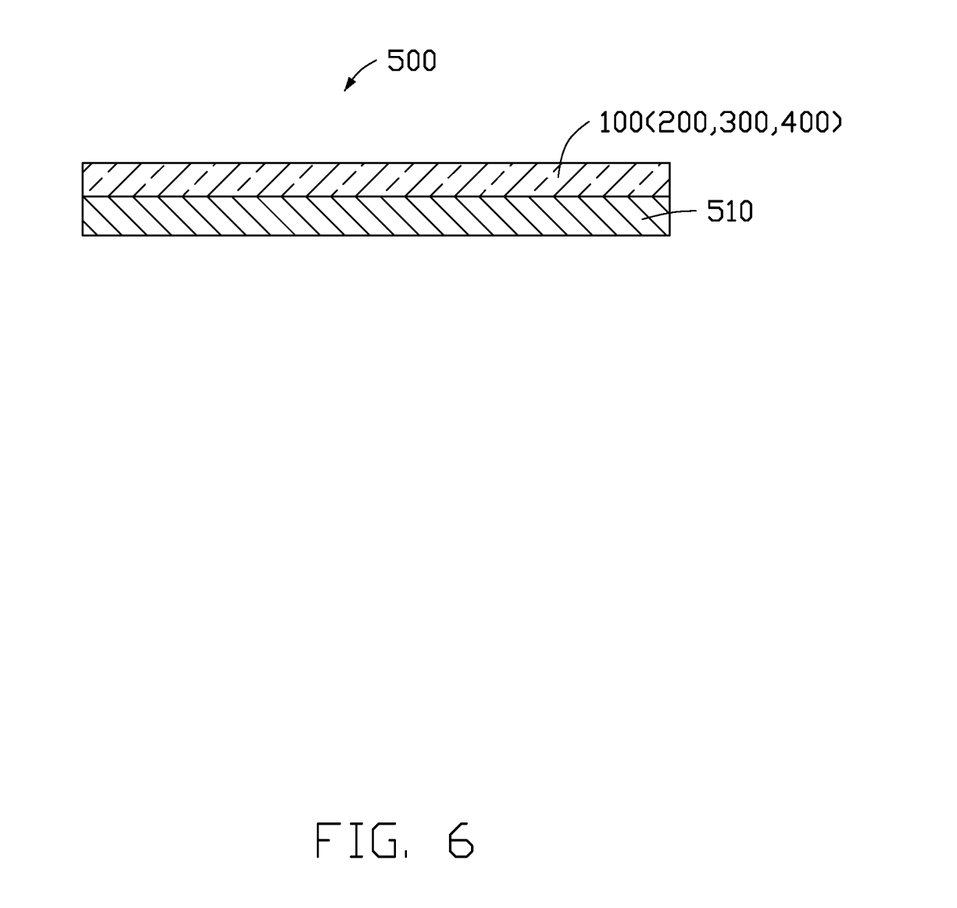
FIG. 6 is a cross-sectional view of a touch display device.

FIG. 6 shows a touch display device 500 including a display panel 510 for displaying images and a touch panel laminated on the display panel 510. The touch panel may be any one of the touch panels 100, 200, 300, and 400. The touch panel senses touches to control the display panel 510 to perform image display.

During process of making the touch panel, when the metal traces are wet-etched, the first electrodes 10 and the second electrodes 20 in the touch area 110 are covered by the transparent photoresist layer 31 and/or the insulating protection layer 50. The etching solution will thus not contact the first electrodes 10 or the second electrodes 20, thereby preventing the etching solution from eroding the electrodes.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A touch panel, comprising:
a substrate;
a plurality of first electrodes on a surface of the substrate;
a transparent conductive photoresist film on the substrate, the transparent conductive photoresist film comprising a transparent photoresist layer on the substrate and a conductive layer on a surface of the transparent photoresist layer away from the substrate, the transparent photoresist layer being electrically insulative and covering the plurality of first electrodes, and the conductive layer forming a plurality of second electrodes;
an insulating protection layer on a surface of the transparent conductive photoresist film away from the substrate, the insulating protection layer covering the plurality of second electrodes;
a plurality of first traces electrically connected to the plurality of first electrodes; and
a plurality of second traces on a surface of the insulating protection layer away from the substrate and extending through the insulating protection layer to electrically connect to the plurality of second electrodes,
wherein the plurality of first traces is on a surface of the insulating protection layer away from the substrate and extends through both the insulating protection layer and the transparent photoresist layer.

2. The touch panel of claim 1, wherein a plurality of through holes is defined in both the insulating protection layer and the transparent photoresist layer, each of the plurality of first traces extends into one of the plurality of through holes; each of the plurality of through holes has an opening area gradually increased in the thickness direction of the touch panel from the transparent photoresist layer toward the insulating protection layer.

3. The touch panel of claim 1, wherein the substrate is transparent, electrically insulative, and flexible.

4. The touch panel of claim 1, wherein: an additional transparent conductive photoresist film is between the substrate and the transparent conductive photoresist film; the additional transparent conductive photoresist film comprises an additional insulating transparent photoresist layer covering the substrate and an additional conductive layer on a surface of the additional insulating transparent photoresist layer away from the substrate; and the additional conductive layer forms the plurality of first electrodes.

5. A touch display device, comprising:
a display panel; and
a touch panel on the display panel, the touch panel comprising:
a substrate;
a plurality of first electrodes on a surface of the substrate;
a transparent conductive photoresist film on the substrate, the transparent conductive photoresist film comprising a transparent photoresist layer on the substrate and a conductive layer on a surface of the transparent photoresist layer away from the substrate, the transparent photoresist layer being electrically insulative and covering the plurality of first electrodes, and the conductive layer forming a plurality of second electrodes;
an insulating protection layer on a surface of the transparent conductive photoresist film away from the substrate, the insulating protection layer covering the plurality of second electrodes;
a plurality of first traces electrically connected to the plurality of first electrodes; and a plurality of second traces on a surface of the insulating protection layer away from the substrate and extending through the insulating protection layer to electrically connect to the plurality of second electrodes, wherein the plurality of first traces is on a surface of the insulating protection layer away from the substrate and extends through both the insulating protection layer and the transparent photoresist layer.

6. The touch display device of claim 5, wherein: a plurality of through holes is defined in both the insulating protection layer and the transparent photoresist layer, and each of the plurality of first traces extends into one of the plurality of through holes; and each of the plurality of through holes has an opening area gradually increased in the thickness direction of the touch panel from the transparent photoresist layer towards the insulating protection layer.

7. The touch display device of claim 5, wherein the substrate is transparent, electrically insulative, and flexible.

8. The touch display device of claim 5, wherein: an additional transparent conductive photoresist film is between the substrate and the transparent conductive photoresist film; the additional transparent conductive photoresist film comprises an insulating transparent photoresist layer covering the substrate and an additional conductive layer on a surface of the insulating transparent photoresist layer away from the substrate; and the additional conductive layer forms the plurality of first electrodes.

9. A method for making a touch panel, comprising:

providing a substrate and forming a plurality of first electrodes on a surface of the substrate;

attaching a transparent conductive photoresist film on the substrate, the transparent conductive photoresist film comprising a transparent photoresist layer and a conductive layer, the transparent photoresist layer being electrically insulative on the substrate and covering the plurality of first electrodes, and the conductive layer being on a surface of the transparent photoresist layer away from the substrate and forming a plurality of second electrodes;

forming an insulating protection layer on a surface of the transparent conductive photoresist film away from the substrate;

defining a plurality of through holes in the insulating protection layer to expose each of the plurality of first electrodes and each of the plurality of second electrodes; and forming a plurality of traces, each of the plurality of traces extending into one of the plurality of through holes to electrically couple to one of the plurality of first electrodes or one of the plurality of second electrodes, wherein: the plurality of traces is formed on the insulating protection layer; and defining the plurality of through holes in the insulating protection layer comprises:

defining a plurality of through holes extending through the insulating protection layer to expose each of the plurality of second electrodes; and defining a plurality of through holes extending through both the insulating protection layer and the transparent photoresist layer to expose each of the plurality of first electrodes.

\* \* \* \* \*